(12) United States Patent
Spiessl et al.

(10) Patent No.: US 9,910,506 B2
(45) Date of Patent: Mar. 6, 2018

(54) METHOD FOR INTERACTING WITH AN OBJECT DISPLAYED ON DATA EYEGLASSES

(71) Applicant: Bayerische Motoren Werke Aktiengesellschaft, Munich (DE)

(72) Inventors: Wolfgang Spiessl, Pfaffenhofen (DE); Felix Lauber, Munich (DE); Jochen Pfannstiel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 195 days.

(21) Appl. No.: 14/921,087

(22) Filed: Oct. 23, 2015

(65) Prior Publication Data
US 2016/0041624 A1 Feb. 11, 2016

Related U.S. Application Data

(63) Continuation of application No. PCT/EP2014/058324, filed on Apr. 24, 2014.

(30) Foreign Application Priority Data

Apr. 25, 2013 (DE) .................. 10 2013 207 528

(51) Int. Cl.
*G06F 3/01* (2006.01)
*H04N 7/18* (2006.01)
(Continued)

(52) U.S. Cl.
CPC .......... *G06F 3/017* (2013.01); *G02B 27/0093* (2013.01); *G02B 27/0172* (2013.01);
(Continued)

(58) Field of Classification Search
CPC ...... G02B 27/017–27/0176; G02B 2027/0174; G02B 2027/0178; G06F 3/011; G06F 3/012; G06F 3/013; G06F 3/017
See application file for complete search history.

(56) References Cited

U.S. PATENT DOCUMENTS 5,319,747 A 6/1994 Gerrissen et al.
5,825,340 A 10/1998 Torizuka et al.
(Continued)

FOREIGN PATENT DOCUMENTS

DE 693 18 102 T2 8/1998
DE 690 32 645 T2 4/1999
(Continued)

OTHER PUBLICATIONS

International Search Report (PCT/ISA/210) issued in PCT Application No. PCT/EP2014/058324 dated Jul. 7, 2014, with English translation (six (6) pages).
(Continued)

*Primary Examiner* — Patrick F Marinelli
(74) *Attorney, Agent, or Firm* — Crowell & Moring LLP

(57) ABSTRACT

The invention relates to a method for interacting with an object that is displayed to a user by smart glasses, which includes a display. The method includes displaying the object for the user using the display, detecting that the user closes a first eye and keeps the first eye closed during a predetermined period of time using a first camera, recording a hand of the user using a second camera determining that the user performs an input action during the predetermined period of time, wherein the input action includes the hand assuming an attitude, and a position from a perspective of a second eye of the user with respect to the object, that meet
(Continued)

a predetermined condition, and performing an action with respect to the object, wherein the action is associated with the input action in advance.

15 Claims, 5 Drawing Sheets

(51) Int. Cl.
G06K 9/00 (2006.01)
G02B 27/00 (2006.01)
G02B 27/01 (2006.01)

(52) U.S. Cl.
CPC .......... *G06F 3/011* (2013.01); *G06K 9/00604* (2013.01); *H04N 7/188* (2013.01); *G02B 2027/014* (2013.01); *G02B 2027/0138* (2013.01); *G02B 2027/0178* (2013.01)

(56) References Cited

U.S. PATENT DOCUMENTS

| | | | |
|---|---|---|---|
| 5,864,334 A | 1/1999 | Sellers | |
| 7,538,744 B1 | 5/2009 | Liu et al. | |
| 7,877,707 B2* | 1/2011 | Westerman | G06F 3/04883 715/863 |
| 8,022,967 B2* | 9/2011 | Okuno | G06F 3/0304 345/619 |
| 8,073,198 B2* | 12/2011 | Marti | G06F 3/011 345/156 |
| 8,228,315 B1 | 7/2012 | Starner et al. | |
| 9,047,698 B2* | 6/2015 | Maciocci | G06F 3/011 |
| 9,116,666 B2* | 8/2015 | Salter | G06F 1/163 |
| 9,142,062 B2* | 9/2015 | Maciocci | G06F 3/011 |
| 9,367,136 B2* | 6/2016 | Latta | G06F 3/017 |
| 9,384,594 B2* | 7/2016 | Maciocci | G06F 3/011 |
| 9,477,303 B2* | 10/2016 | Fleischmann | G06F 3/011 |
| 2005/0068316 A1* | 3/2005 | Endo | G06T 15/10 345/419 |
| 2006/0044327 A1* | 3/2006 | Okuno | G06F 3/011 345/626 |
| 2009/0019188 A1* | 1/2009 | Mattice | G06F 3/0421 710/17 |
| 2009/0110235 A1* | 4/2009 | Marti | G06F 3/011 382/103 |
| 2010/0205667 A1* | 8/2010 | Anderson | G06F 3/013 726/19 |
| 2010/0225566 A1 | 9/2010 | Sato | |
| 2011/0260967 A1 | 10/2011 | Matsushima | |
| 2011/0316763 A1 | 12/2011 | Yada | |
| 2012/0117514 A1* | 5/2012 | Kim | G06F 3/011 715/849 |
| 2012/0206452 A1* | 8/2012 | Geisner | G02B 27/017 345/419 |
| 2012/0249416 A1* | 10/2012 | Maciocci | G06F 3/011 345/156 |
| 2012/0249544 A1* | 10/2012 | Maciocci | G06F 3/011 345/419 |
| 2012/0249590 A1* | 10/2012 | Maciocci | G06F 3/011 345/633 |
| 2012/0249591 A1* | 10/2012 | Maciocci | G06F 3/011 345/633 |
| 2012/0249741 A1* | 10/2012 | Maciocci | G06F 3/011 348/46 |
| 2012/0280903 A1 | 11/2012 | Fink | |
| 2013/0021374 A1* | 1/2013 | Miao | G06F 3/011 345/633 |
| 2013/0141419 A1* | 6/2013 | Mount | G06F 3/011 345/419 |
| 2013/0265220 A1* | 10/2013 | Fleischmann | G06F 3/011 345/156 |
| 2014/0306891 A1* | 10/2014 | Latta | G06F 3/017 345/158 |
| 2015/0193005 A1* | 7/2015 | Di Censo | G06F 3/038 345/156 |
| 2016/0011669 A1* | 1/2016 | Fink | G06F 3/012 345/156 |
| 2016/0012281 A1* | 1/2016 | Fink | G06K 9/00355 382/103 |
| 2016/0041624 A1* | 2/2016 | Spiessl | G06F 3/011 345/8 |
| 2016/0057339 A1* | 2/2016 | Raffle | G06K 9/00281 348/222.1 |

FOREIGN PATENT DOCUMENTS

| | | |
|---|---|---|
| DE | 199 53 835 C1 | 5/2001 |
| DE | 10 2007 057 208 A1 | 5/2009 |
| GB | 2494907 A | 3/2013 |
| JP | 2008-17501 A | 1/2008 |
| WO | WO 99/32959 A2 | 7/1999 |

OTHER PUBLICATIONS

German Search Report issued in counterpart German Application No. 10 2013 207 528.6 dated Feb. 28, 2014, with partial English translation (ten (10) pages).

* cited by examiner

METHOD FOR INTERACTING WITH AN OBJECT DISPLAYED ON DATA EYEGLASSES

CROSS REFERENCE TO RELATED APPLICATIONS

This application is a continuation of PCT International Application No. PCT/EP2014/058324, filed Apr. 24, 2014, which claims priority under 35 U.S.C. § 119 from German Patent Application No. 102013207528.6, filed Apr. 25, 2013, the entire disclosures of which are herein expressly incorporated by reference.

BACKGROUND AND SUMMARY OF THE INVENTION

The invention relates to a method for interacting with an object being displayed to a user via smart glasses, the smart glasses including a display.

It is known that smart glasses and head-mounted displays include displays. Smart glasses are worn by a user on the user's head in a manner similar to how conventional glasses (used as vision aid) are worn. Thus, the display of the smart glasses is within the field of view of the user wearing it. Some smart glasses include a display for only one eye, while other smart glasses include two part-displays, where one part-display is allocated to each eye.

It is also known that smart glasses can include a semi-transparent display, which enables the user to detect both displayed information and the environment behind the display. In addition, it is known that smart glasses can also include a non-transparent display.

In general, the contents that are selectable by a user on a display of a Personal Computer ("PC") can be displayed on a display of smart glasses. PCs can include, for example, a Liquid Crystal Display ("LCD") as the display and a keyboard and mouse or touchpad as input devices. In contrast to a PC, smart glasses, like conventional glasses, are highly mobile. Thus, for smart glasses, the typical input and output devices such as a keyboard or a mouse are not available for operation or, otherwise, carrying them around would restrict the mobility of the user and the comfort of carrying them around. This presents the problem of operating selectable and/or manipulatable objects that are displayed on the display of smart glasses.

U.S. Pat. No. 8,228,315 discloses smart glasses with a projector which projects a pattern on a surface. It further discloses a camera that detects the interaction of a user with the pattern in order to derive an input of the user. However, this is disadvantageous in that the method requires a projector in the smart glasses.

The present invention thus provides a method and a device which improve the input options for interactive objects being displayed by smart glasses.

The object of the invention is achieved by the various embodiments, examples, developments, and/or aspects of the present disclosure.

According to one example, a method for interacting with an object being displayed to a user via smart glasses, the smart glasses comprising a display, includes displaying the object for the user using the display of the smart glasses; detecting that the user closes a first eye and keeps it closed during a predetermined period of time using a first camera configured to record the first eye of the user; recording a hand of the user using a second camera; determining that the user performs an input action during the predetermined period of time, wherein the input action includes the hand of the user assuming an attitude, and a position from a perspective of a second eye of the user with respect to the object, that meet a predetermined condition; carrying out an action with respect to the object, wherein the action is associated with the input action in advance.

This enables the user, for example, to interact with an object displayed on the smart glasses with his or her hand. For instance, it possible to select one object from a number of objects being displayed, or to interact with one particular object or a number of particular objects. For this purpose, the user can form a ring, for example, with the user's thumb and index finger, and position the user's hand in such a way that the object which the user wishes to select is located in the ring from the perspective (that of the second eye) of the user. According to the method, it is detected that the user has placed the user's hand around the particular object in this attitude and the object is selected. In other words, the user interacts by way of a suitable hand gesture, with an active area in the virtual image displayed to the user (e.g., the entire display area of the smart glasses) which is used for selecting the object or interacting with the object contained therein. In this example, the size of the objects displayed and the distance of the hand from the second eye of the user can be influencing variables. In one instance, the closer the hand is to the second eye of the user, the greater the area selectable by it or, the more objects or the larger the objects that can be selected and interacted with.

Accordingly, the user can interact with the object without having to use external interfaces, such as the input means of a keyboard or a mouse. This ensures the mobility and the comfort of operation of the smart glasses. At the same time, the input is intuitive because the user can "point" with his or her hand to what the user wishes to select, as a user would on a touch screen (or a touch-sensitive video screen). In contrast to interactions with touch screens, the interaction according to the method of the invention can also be effected by means of gloves, for example, and only one hand is needed for the input since it is not necessary to hold a device. In this regard, the method provides for inputs at extreme temperatures and/or to accommodate special hygiene requirements since it is "contactless." At the same time, the privacy of the user is preserved since it is only the user who can see the contents with which the user is interacting with.

In some examples, the closing of one eye of the user serves as a trigger for the interaction mode or for performing an input action. In instances where the smart glasses includes a part-display for each eye, the user perceives the display of the smart glasses with both eyes. As such, the hand of the user appears at a different position for each eye. In order to provide an unambiguous input, an eye of the user can be specified for input functionality. In one example, the user's second eye can be opened (apart from blinking) and used for looking during the period of time in which the first eye is closed. In this regard, a particular eye (either the right one or the left one) is closed in order to be able to perform an input action. In some instances, if it can be detected which eye is currently closed, the input action can also be enabled for the eye that is open. Thus, the possibility to perform an input action, and in particular an object selection mode, may be activated based on the detection of a closing of one eye (e.g., a closing of the eye that goes beyond blinking).

The detection of whether an eye is opened or closed can take place with the use of a camera which may be included in the smart glasses or mounted on them to take recordings in the direction of the first eye of the user. In some instances, the camera does not need to meet any particular requirements for resolution since the detection of whether the eye is opened or closed is also possible with a camera of low resolution (e.g., 4000 picture elements). Another camera in the smart glasses which is directed in the direction of the second eye of the user can be used for determining the position of the smart glasses with respect to the second eye and, for example, the pupil of the second eye of the user. This makes it possible to determine how the display of the smart glasses is aligned with respect to the second eye of the user, and thus possible to determine in what direction contents, such as the object, need to be displayed to the user. To this extent, the position of the center of the pupil in the recordings from the camera is typically evaluated. Since the alignment of the camera with respect to the display of the smart glasses is known, it is thus possible to infer the alignment of the display with respect to the eye of the user. In an alternative example, the alignment of the display of the smart glasses with respect to the second eye of the user is assumed to be known. This is appropriate, for example, when the smart glasses are designed in such a manner that they are always positioned in the same position on the head of the user and the alignment of the display with respect to the second eye of the user is therefore known, for instance, when the alignment has been pre-measured or pre-calibrated.

In addition, the alignment of the smart glasses that is determined via the camera or the two cameras of the smart glasses can also be used for displaying augmented reality contents, also called contact-analogous contents, positionally correct for the user.

In another alternative example, a camera may be mounted to a vehicle to record the user in order to determine an alignment or detect the closing of an eye. From the recordings of the mounted camera, the position of the display of the smart glasses with respect to the eyes of the user or with respect to the head of the user could also be determined.

The hand of the user can be recorded by a further camera in the smart glasses, where it is mounted on the smart glasses in such a manner that it faces in the same direction as the user would be when looking straight ahead. Other alignments of the camera may also be considered. This camera then records the hands of the user. The recorded hands of the user can be placed in relation to his head. In other examples, it is also conceivable that a camera can be installed, for example, in a vehicle, to record the hands of the user. This can be the camera already mentioned above for the purpose of detecting the closed eye. As such, the camera in the vehicle can thus fulfill two functions. In other examples, a separate camera can be provided in the vehicle to record the hand of the user.

If the user carries out, for example, an input action in which the thumb and the index finger form a ring, the area of the display enclosed by the ring changes with the distance of the ring from the display from the perspective of the second eye. In this regard, when determining whether the position and attitude of the hand of the user meet the predetermined condition, the distance of the hand from the second eye of the user or the display of the smart glasses are also taken into consideration. The distance can be determined in various ways. For example, known sizes from the hand can be compared with the sizes in the recording of the camera (of the smart glasses or of the vehicle). In some instances, markings or objects of known sizes held in the user's hand may be provided for this purpose. In some aspects of the method, determining a range of the distance is sufficient, wherein the determined ranges can also depend on the contents or objects displayed on the smart glasses. If, for example, the objects are arranged in such a manner that the position of the hand and the attitude of the hand can be unambiguously associated with a displayed object, even with a rough range of the distance, the predetermined condition of the input action can be considered to be met.

In a further aspect, supplementing the camera with, for example, with an infrared sensor may help determine the distance from the recorded hand. Furthermore, time-of-flight ("TOF") cameras can be used in which the distance of the recorded hand is also determined for each picture element of the recording (or only for a particular proportion of the picture elements).

The method further provides that optical paths from the hand to the second eye of the user are determined and the positions of the intersections of the optical paths with the display are also determined. Based on the position of the intersections with the display and the position of the displayed objects displayed, the relation of the position of the hand to one or more displayed objects can be established. Thus, for example, it can be determined whether the attitude and position of the hand for a particular object meet the predetermined condition. The selection of the optical paths can be carried out by way of a preclassification of the detected attitude (or position) of the hand. An optical path is also called hand-eye vector herein.

If, for example, it is detected that a thumb and an index finger form a ring, one or more points can be determined on the hand at regular intervals (such as, along the inner circumference of the ring) for which the optical path to the second eye of the user is determined. The intersections produced on the display can then be connected by lines, or a ring linking the intersections can be determined in other ways, for example, using classical geometry. In one example of the method, prior knowledge about the attitude of the hand can be taken into consideration for evaluating the intersections of the optical paths with the display. The figure or image of the attitude of the hand produced on the display is used for selecting one or more objects that are on the display. For example, all objects which are completely or partially in the image of the attitude of the hand on the display can be selected (or interacted with). The closer the hand is held to the display, the image of the attitude of the hand will appear larger on the display and more objects can be selected.

Overall, the position of the hand, the position of the camera which records the hand, the position of the display, the position of the virtual contents, and/or the position of the second eye must be put in relation to one another, which is called correlation and processing.

In a further development, the act of determining that the user performs an input action further includes the following: determining a spatial position of the hand with respect to a position of the display of the smart glasses; and determining a position of the object within the display, where a spatial position of the second eye with respect to the display of the smart glasses is known. Based on this information, the relation, e.g., optical relation, between an object to a hand can be determined for the user from the perspective of the user's second eye. As such, it can be determined whether the conditions for the input action are met.

In yet a further development, the predetermined condition includes one or more of the following: a) the hand assumes an attitude in which a ring or circle is formed with one or more fingers, or essentially a ring is formed, and the hand is positioned such that the object is enclosed by the ring or circle from the perspective of the second eye; b) the hand assumes an attitude in which thumb and index finger are extended and approximately form, or symbolize, an angle of 90 degrees, and the hand is positioned such that the object, from the perspective of the second eye, is at least partially located in an imaginary rectangle, where the imaginary rectangle has two short edge lengths which correspond to the length of the thumb, and two long edge lengths which correspond to the length of the index finger, and the position of the imaginary rectangle, from the perspective of the second eye, is such that two edges (e.g., a short edge length and a long edge length) correspond to the thumb and index finger; c) the hand assumes an attitude in which thumb and index finger together approximately form approximately a U shape, and the hand is positioned such that the object, from the perspective of the second eye, is at least partially contained in the U shape; d) the hand assumes an attitude in which only the index finger is extended and the hand is positioned such that the index finger, from the perspective of the second eye, touches the object or at least points in its direction. The above examples illustrate intuitive gestures that allow the user to interact with the displayed objects.

In another development, the method furthermore comprises: recording the second hand of the user with the use of the second camera; wherein the input action further includes the second hand of the user assuming an attitude and, from the perspective of the second eye of the user with respect to the object, a position which meet the predetermined condition, wherein the predetermined condition further includes the attitude and the position both for the first and for the second hand. Thus, two-handed input actions are also possible and the spectrum of possible attitudes and positions becomes significantly more differentiated. In this example, the predetermined condition can include the following: the first and the second hand each assumes an attitude in which the thumb and index finger together approximately form a U shape and the first and the second hand are in each case positioned such that the object, from the perspective of the second eye, is contained at least partially in the respective U shape, and the attitude and position of the first and of the second hand are such that the openings of the respective U shapes point towards one another.

When one or more conditions of the input action are met, various actions can be carried out with respect to the object. For example, the following are some of the actions: selection of the object or marking of the object, respectively, starting the displacement of the object, deleting, starting or ending. The action can also depend on the type of object or of the representation of a data object. Thus, for a symbol associated with an application, the action can be the starting of the application. For instance, object types can be symbols, links, functions, applications, text, images, videos and/or audio files. The objects can be interleaved with one another.

In yet another development, the method also comprises: determining that the user performs a second input action during the predetermined period of time; wherein the second input action includes the hand of the user abandoning the attitude associated with the first input action; carrying out a second action with respect to the object, wherein the second action is associated with the second input action in advance. In this way, a drag-and-drop action can be carried out, for example. With the first input action, for example forming a ring of thumb and index finger around an object, the object is selected and can be made "displaceable". In other words, for instance, the object can be "displaced" with the ring closed around it, e.g., its position on the display changes in accordance with the change of the position of the hand. If, for example, the ring of thumb and index finger is broken up by the hand, the object is deselected (in other words "dropped") and is no longer selected for the drag-and-drop action.

In this regard, various sequences of attitudes of the hand can trigger sequences of actions for an object. Thus, for example, an object could be selected initially by the thumb and index finger being formed into a ring. If the user then changes the attitude of the hand to form a fist, this can trigger the action of deletion. After determining whether deletion is really required, showing the palm of the user's hand can be considered to confirm the deletion. If, for instance, the back of the hand is shown, the object is not deleted. As such, a number of different actions can thus be carried out for an object after its selection, one input action being provided for each action. After the selection of one or more objects, certain conditions of an input action can provide that requirements are made only for the attitude of the hand, but not the position of the hand, or vice versa.

In a further development, the method also includes displaying parts of the object only in areas in which the hand of the user, from the perspective of the second eye of the user, is not covered. In some instances, the hand of the user can be covered by the displayed objects of the smart glasses. To prevent this, the outline of the hand can be detected, for example by a camera of the smart glasses, so that objects or parts thereof that cover the hand from the perspective of the second eye of the user are not displayed.

In this regard, it is possible to ensure that the user can see and optimally establish the relation of the hand with respect to the object with which it is intended to interact. For this purpose, the intersection between the user's hand and the virtual contents on the display is first calculated with the aid of the hand-eye vector and/or vectors of optical paths. During the subsequent rendering (editing of the display), for example, the intersection can now left open or colored.

In another aspect of the invention, a device includes smart glasses and an electronic processing means, e.g., a computer, a microcontroller, dedicated circuits, a processor, wherein the device is configured to perform one or more of the above methods and various aspects thereof. The smart glasses can further include a camera directed towards an eye of the user and a camera directed toward the viewing direction of the user. The camera may be a TOF camera.

In yet another aspect of the invention, a non-transitory computer readable medium storing program instructions, wherein the program instructions when executed by at least one processor performs one or more methods according to the methods described above.

Other objects, advantages and novel features of the present invention will become apparent from the following detailed description of one or more preferred embodiments when considered in conjunction with the accompanying drawings.

BRIEF DESCRIPTION OF THE DRAWINGS

Identical reference symbols relate to corresponding elements over all figures.

DETAILED DESCRIPTION OF THE DRAWINGS

Figure 1:
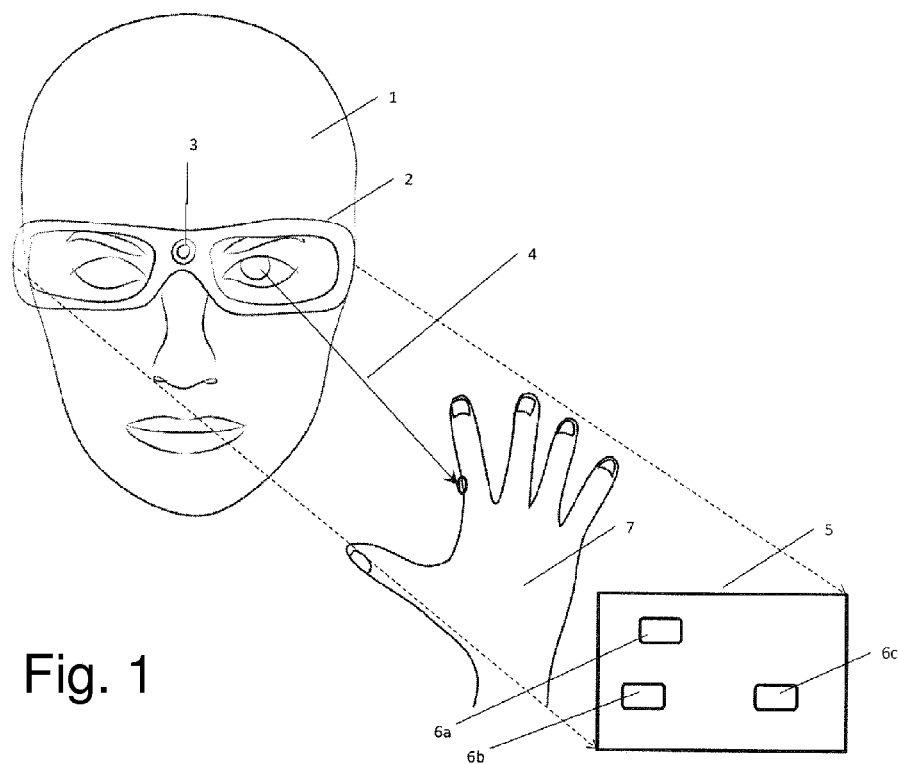
FIG. 1 illustrates a user with smart glasses according to an exemplary embodiment of the invention.

FIG. 1 illustrates a user 1 with smart glasses 2 who performs an input action with the user's hand 7 according to one exemplary embodiment. The smart glasses includes a TOF camera 3 which takes recordings in the viewing direction of the user 1. The smart glasses 1 includes two semi-transparent part-displays (not shown) on which the virtual image 5 is displayed to the user 1. In the virtual image 5, objects 6a, 6b, and 6c are displayed to the user 1. The smart glasses contain on the inside (not shown) two cameras with the aid of which one eye of the user 1 in each case is recorded. From the position of the second eye of the user in the recording, the alignment of the display of the smart glasses with respect to the second eye may be inferred. To activate the input mode, for example, the user 1 closes the right eye for a particular period of time (pupil of the right eye is not visible in FIG. 1) and keeps the eye closed during the input. The user 1 holds the user's hand 7 in front of his or her head in his or her field of view. The hand-eye vector 4 is determined for a point (depicted by the circle marking) of the hand 7. Based on the hand-eye vector and based on its intersection with the display of the smart glasses, the arrangement of objects 6a to 6c with respect to the circle-marked point of the hand 7 of the user 1 can be obtained from the perspective of the eye of the user 1. It is checked whether the user is holding the hand 7 in an attitude which corresponds to a condition of an input action to be selected. Furthermore, it is determined (based at least in part on the intersections of hand-eye vectors) using the left-hand part-display of the smart glasses which object the user has selected.

Figure 2:
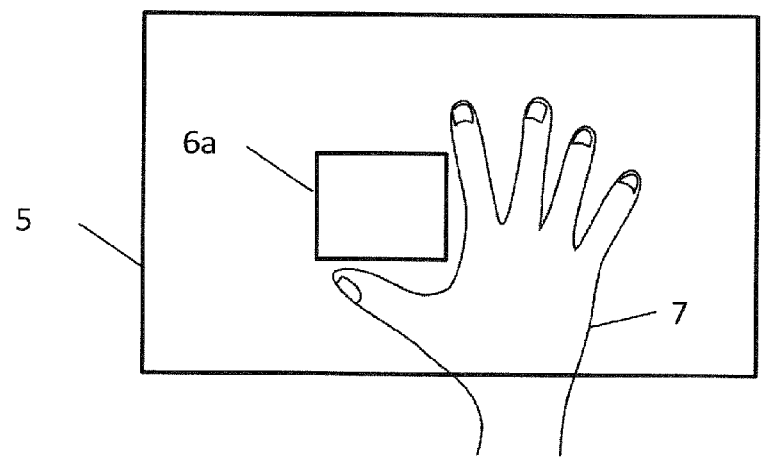
FIGS. 2 to 3 illustrate a user's view from one eye according to exemplary embodiments of the invention.

FIG. 2 illustrates a user's view from one eye according to an exemplary embodiment of the invention. The hand 7 of the user forms approximately a right angle via its thumb and index finger. The object 6a is located in this angle and is displayed in the virtual image 5.

Figure 3:
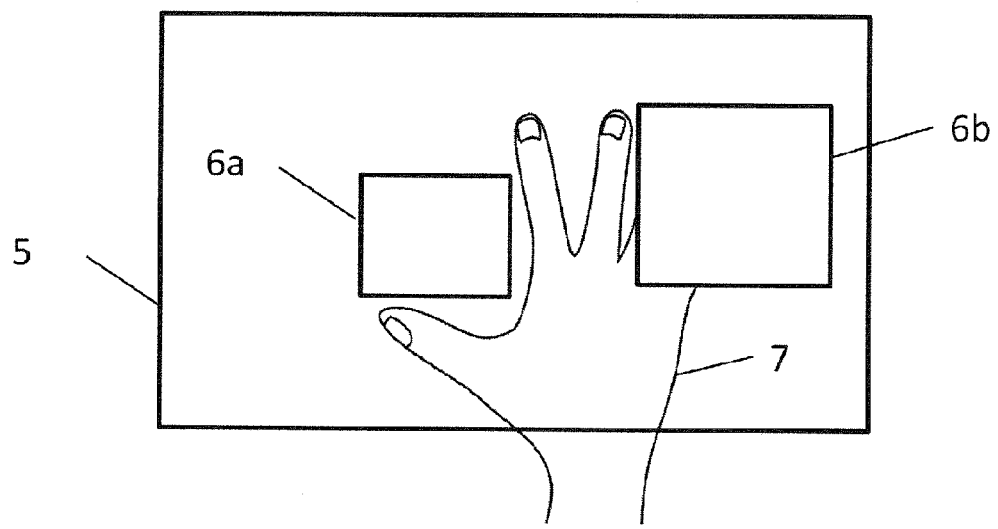

FIG. 3 illustrates a user's view from one eye according to an exemplary embodiment of the invention. This example is based on the example of FIG. 2, but with an additional object, object 6b, as shown. The object 6b is shown without considering the hand and is superimposed on the hand 7 in the user's view. The user is thus not able to check whether he or she is assuming the correct hand orientation and the correct position.

Figure 4:
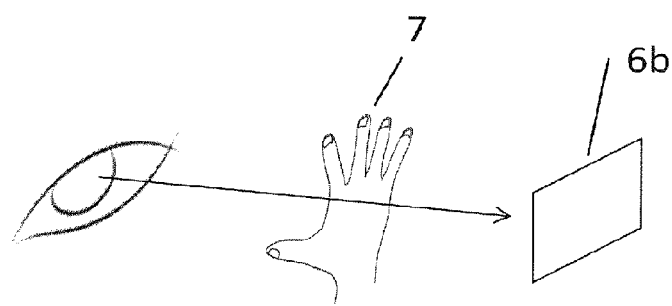
FIG. 4 illustrates a determination of a hand-eye-object vector according to an exemplary embodiment of the invention.

FIG. 4 illustrates a determination of a hand-eye-object vector according to an exemplary embodiment of the invention. Based on this determination, it is possible to further determine the parts of the object 6b covering the parts of the hand 7.

Figure 5:
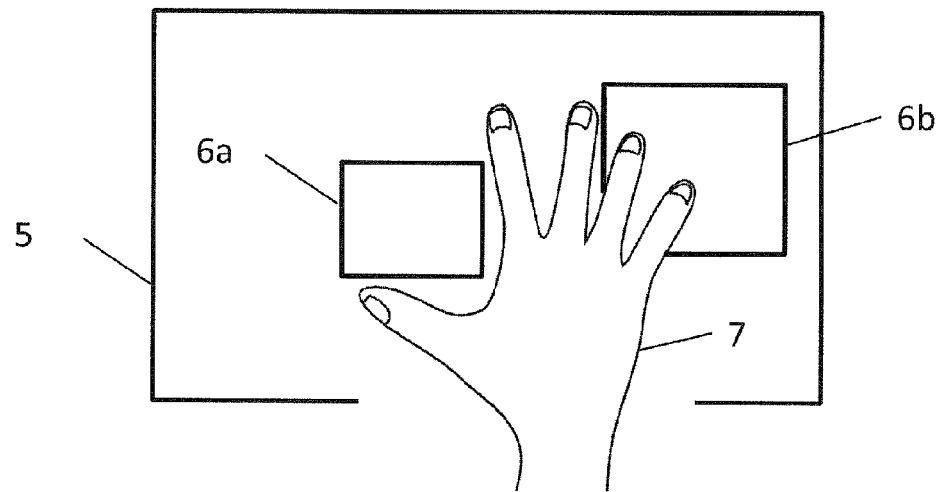
FIG. 5 illustrates a user's view from one eye according to exemplary embodiments of the invention.

FIG. 5 illustrates a user's from one eye according to an exemplary embodiment of the invention. Once again, this example is based on the example of FIG. 2. However, in FIG. 5, the possible covering of the hand 7 by the object 6b is taken into consideration and the object 6b is shown only where the hand is not. This enables the user to perform a better correction and execution of the hand attitude and hand positioning.

FIGS. 6A to 6D illustrate input actions for selecting an object according to an exemplary embodiment of the invention.

Figure 6A:
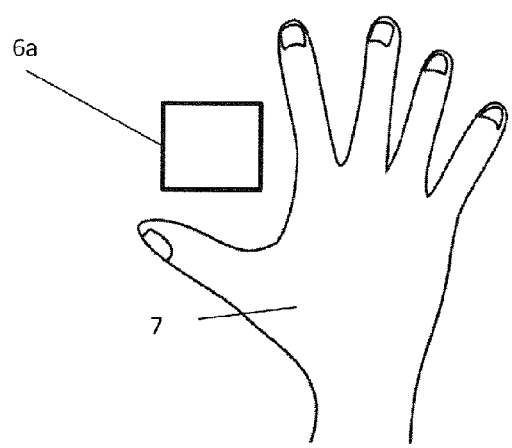
FIGS. 6A to 6D illustrate input actions for selecting an object according to an exemplary embodiment of the invention.

FIG. 6A illustrates that the hand 7 assumes an attitude in which the thumb and the index finger are extended and form (or are intended to symbolize) an angle of approximately 90 degrees. The hand is positioned such that the object 6a, from the perspective of the second eye, is at least partially located in the angle formed by the thumb and index finder, or in other words, at least partially located in an imaginary rectangle, the two short edge lengths of the imaginary rectangle would correspond to the length of the thumb and the two long edge lengths of the imaginary rectangle would correspond to the length of the index finger, and the position of which, from the perspective of the second eye, is such that two edges correspond to the thumb and index finger.

Figure 6B:
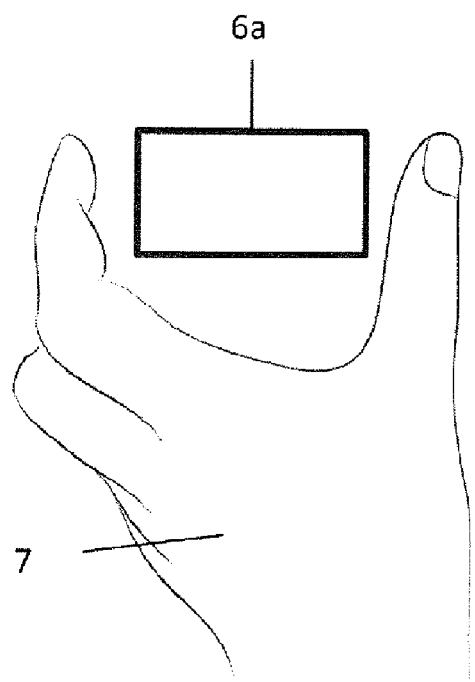

FIG. 6B illustrates that the hand 7 assumes an attitude in which the thumb and the index finger, together, form approximately a "U" shape, and the hand 7 is positioned such that the object 6a, from the perspective of the second eye, is at least partially contained in the U shape.

Figure 6C:
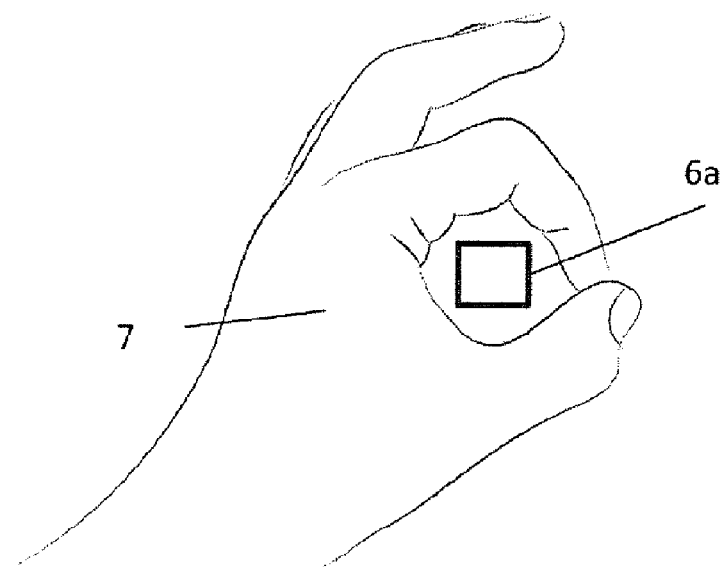

FIG. 6C illustrates that the hand 7 assumes an attitude in which a ring or circle is formed with the thumb and the index finger of the hand 7, and the hand 7 is positioned such that the object 6a, from the perspective of the second eye, is enclosed by the ring or circle.

Figure 6D:
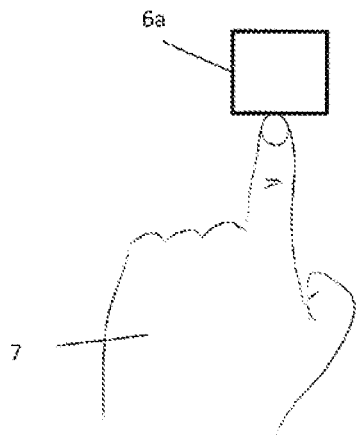

FIG. 6D illustrates that the hand 7 assumes an attitude in which only the index finger of the hand 7 is extended and the hand 7 is positioned such that the index finger, from the perspective of the second eye, touches the object 6a.

Figure 7:
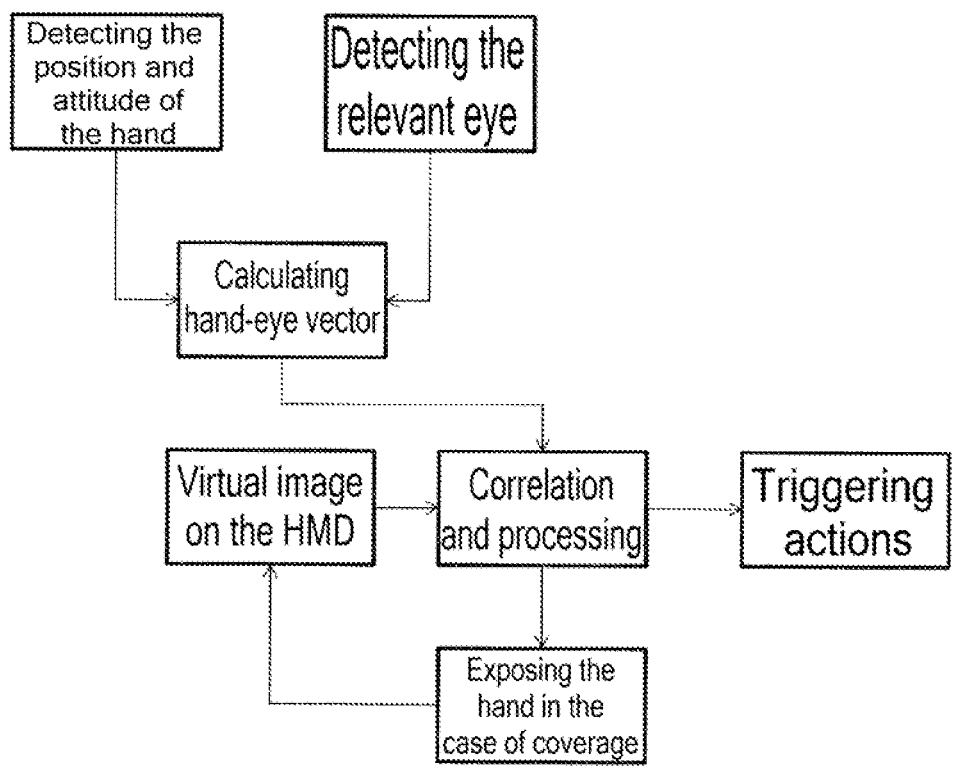
FIG. 7 is a flowchart of a method according to an exemplary embodiment of the invention.

FIG. 7 is a flowchart of a method according to an exemplary embodiment of the invention. First, the spatial position and attitude of the hand are detected and the position of the relevant eye, which in this case is the second eye. The hand-eye vector is then calculated. In the "correlation and processing" block, the intersections of the hand-eye vector with the display is calculated and related to the positions of the objects that are displayed. If the hand is covered by one or more objects, the objects are not displayed at location(s) where the hand is located and a new virtual image on the smart glasses is calculated or rendered. The new virtual image is displayed. Based on the correlation and processing, actions are triggered when the conditions of the corresponding input action, to which the action is allocated, are met.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for interacting with a first object being displayed to a user via smart glasses, the smart glasses comprising a display, the method comprising acts of:
   displaying the first object and a second object in a first virtual image for the user using the display of the smart glasses;
   detecting that the user closes a first eye and keeps the first eye closed during a predetermined period of time using a first camera configured to record the first eye of the user; recording a first hand of the user using a second camera;
   determining a hand-eye-object vector associated with the second object;

determining that at least a portion of the second object is covering at least a portion of the first hand based at least on the determined hand-eye object vector and displaying the first and second objects in a second virtual image such that the portion of the second object covering the first hand is not displayed;

determining that the user performs a first input action for the first object in the second virtual image during the predetermined period of time, wherein the first input action includes the first hand of the user assuming an attitude, and a position from a perspective of a second eye of the user with respect to the first object, that meet a predetermined condition; and carrying out a first action with respect to the first object, wherein the first action is associated with the first input action in advance, and wherein the hand-eye-object vector indicates a positional relationship among a second eye of the user, the first hand, and the second object.

2. The method according to claim 1, wherein the predetermined condition includes one or more of the following:

an attitude of the first hand in which a ring or a circle is formed with one or more fingers, and the first hand is positioned such that the first object is enclosed by the ring or circle from the perspective of the second eye;

an attitude of the first hand in which a thumb and an index finger are extended to form or symbolize an angle of approximately 90 degrees, and the first hand is positioned such that the first object is at least partially located in an imaginary rectangle from the perspective of the second eye, wherein the imaginary rectangle has two short edge lengths corresponding to a length of the thumb and two long edge lengths corresponding to a length of the index finger, and a position of the imaginary rectangle from the perspective of the second eye is such that two edges correspond to the thumb and index finger;

an attitude of the first hand in which the thumb and the index finger, together, form approximately a U shape, and the first hand is positioned such that the first object is at least partially contained in the U shape from the perspective of the second eye; and an attitude of the first hand in which only the index finger is extended and the hand is positioned such that the index finger touches the first object, or at least points in a direction of the first object, from the perspective of the second eye.

3. The method according to claim 1, further comprising the act of:

recording a second hand of the user using the second camera;

wherein the first input action further includes the second hand of the user assuming an attitude and, a position from the perspective of the second eye of the user with respect to the first object, that meet the predetermined condition, wherein the predetermined condition further includes the attitude and the position for both the first hand and the second hand.

4. The method according to claim 3, wherein the predetermined condition further includes:

an attitude of the first hand and an attitude of the second hand in which, for each attitude, a respective thumb and a respective index finger, together, form approximately a U shape, and the first hand and the second hand are each positioned such that the first object is at least partially contained in the respective U shape from the perspective of the second eye, wherein the attitude and the position of the first hand and the second hand are such that openings of the respective U shapes point towards one another.

5. The method according to claim 1, the act of determining that the user performs the first input action further comprising:

determining a spatial position of the first hand with respect to a position of the display of the smart glasses; and determining a position of the first object within the display, wherein a spatial position of the second eye with respect to the display of the smart glasses is known.

6. The method according to claim 1, the act of determining that the user performs the first input action further comprising:

determining a spatial position of the first hand with respect to the second eye of the user;

determining a position of the first object within the display;

determining optical paths or vectors from points of the first hand to the second eye of the user;

determining a position of an intersection of the optical paths or the vectors using the display of the smart glasses; and determining a position of the intersection with respect to the displayed first object using the display;

wherein a spatial position of the second eye with respect to the display of the smart glasses is known.

7. The method according to claim 5, wherein the smart glasses includes the second camera and a direction of recording of the second camera is in a direction of viewing of the user looking straight ahead and the second camera is configured to determine one or more distances of at least some recorded picture elements in the recording.

8. The method according to claim 1, wherein the smart glasses includes the first camera.

9. The method according to claim 1, further comprising the acts of:

determining that the user performs a second input action sequentially after the first input action during the predetermined period of time wherein the second input action involves the first hand of the user abandoning the attitude associated with the first input action, or the first hand of the user assuming a predetermined attitude; and carrying out a second action with respect to the first object, wherein the second action is associated with the second input action in advance.

10. A device comprising:

a display;

a first camera;

a second camera; and at least one processor executing stored program instructions to:

display a first object and a second object in a first virtual image for a user using the display;

detect that the user closes a first eye and keeps the first eye closed during a predetermined period of time using the first camera configured to record the first eye of the user;

record a hand of the user using the second camera;

determine a hand-eye-object vector associated with the second object;

determine that at least a portion of the second object is covering at least a portion of the first hand based at least on the determined hand-eye object vector and displaying the first and second objects in a second virtual image such that the portion of the second object covering the first hand is not displayed;

determine that the user performs an input action for the first object in the second virtual image during the predetermined period of time, wherein the input action includes the hand of the user assuming an attitude, and a position from a perspective of a second eye of the user with respect to the first object, that meet a predetermined condition; and carry out an action with respect to the first object, wherein the action is associated with the input action in advance, and wherein the hand-eye-object vector indicates a positional relationship among a second eye of the user, the first hand, and the second object.

11. A non-transitory computer readable medium storing program instructions, the program instructions when executed by at least one processor performs a method comprising acts of:

displaying a first object and a second object in a first virtual image for a user using a display detecting that the user closes a first eye and keeps the first eye closed during a predetermined period of time using a first camera configured to record the first eye of the user;

record a hand of the user using a second camera;

determining a hand-eye-object vector associated with the second object;

determining that at least a portion of the second object is covering at least a portion of the first hand based at least on the determined hand-eye object vector and displaying the first and second objects in a second virtual image such that the portion of the second object covering the first hand is not displayed;

determining that the user performs a first input action for the first object in the second virtual image during the predetermined period of time, wherein the first input action includes the first hand of the user assuming an attitude, and a position from a perspective of a second eye of the user with respect to the first object, that meet a predetermined condition; and carrying out a first action with respect to the first object, wherein the first action is associated with the first input action in advance, and wherein the hand-eye-object vector indicates a positional relationship among a second eye of the user, the first hand, and the second object.

12. The method according to claim 2, wherein the ring or the circle is formed with the thumb and the index finger of the user.

13. The method according to claim 6, wherein the smart glasses includes the second camera and a direction of recording of the second camera is in a direction of viewing of the user looking straight ahead and the second camera is configured to determine one or more distances of at least some recorded picture elements in the recording.

14. The device according to claim 10, wherein the device is smart glasses.

15. The non-transitory computer readable medium according to claim 11, wherein the computer program is executed on smart glasses.

* * * * *